May 8, 1962 N. O. THANING 3,033,235
VALVES FOR THE CONTROL OF FLUID FLOW
Filed Dec. 27, 1960 2 Sheets-Sheet 1

INVENTOR
Niels Otto Thaning
By Watson, Cole, Grindle & Watson
ATTORNEYS

United States Patent Office 3,033,235
Patented May 8, 1962

3,033,235
VALVES FOR THE CONTROL OF FLUID FLOW
Niels Otto Thaning, International House, 61 Loveday St.,
Johannesburg, Union of South Africa
Filed Dec. 27, 1960, Ser. No. 78,517
12 Claims. (Cl. 137—625.28)

This invention relates to valves for controlling the flow of fluids and in particular glandless valves which do not require precision ground or machined valve seats.

Valves of the type referred to generally incorporate the use of some form of resilient plug in the fluid passageway through the valve and it is the object of the present invention to provide improvements to this type of valve which will facilitate the use and particularly the repair or replacement of the operating mechanism of such valves.

According to this invention there is provided a valve for the control of fluid comprising a valve body having a fluid passage therethrough, a composite deformable plug located in the passage, said plug comprising an outer deformable sleeve positioned across the passage and retained in sealing engagement around oppositely disposed apertures through the walls of the passage and a further deformable member positioned within said sleeve and connected to an operating mechanism, the further member adapted to transmit deformations applied to itself through the operating mechanism to the sleeve to open or close an annular fluid path around the plug in the passage.

Further features of this invention provide for the inner deformable member to be a further sleeve located on an axially movable spindle extending across the valve body and for the inclusion of rigid guides in the valve body to control the deformation of plug in the required directions.

This invention also makes provision for liquid filled pockets in the deformable members to facilitate distortion of the latter during operation of the valve.

Figure 1:
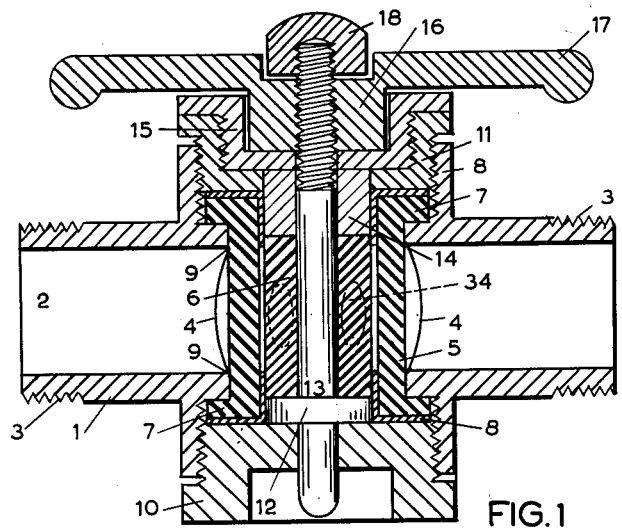
Figure 2:
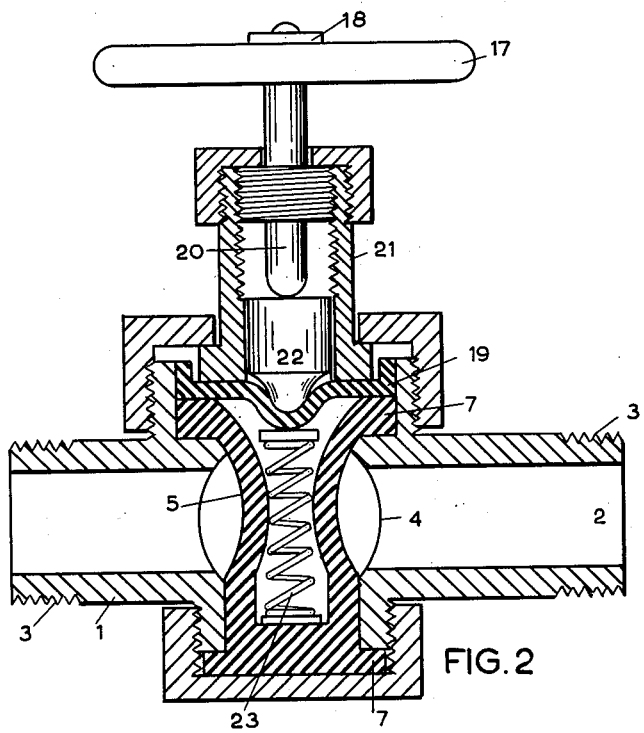
Figure 3:
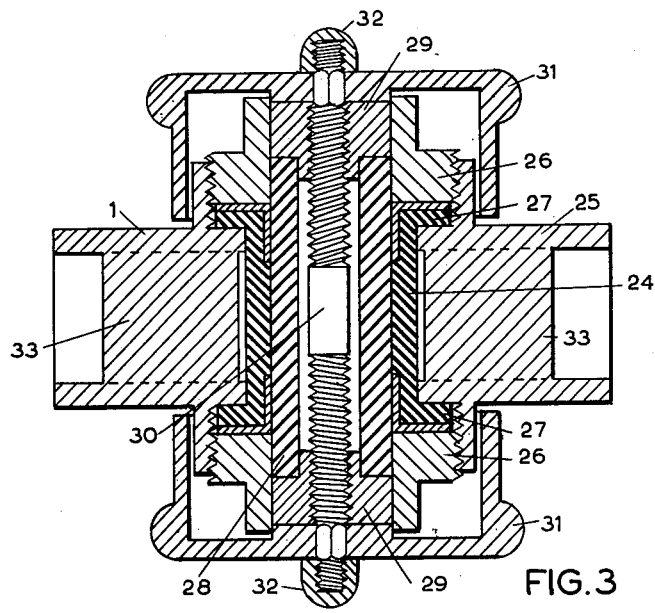
Figure 4:
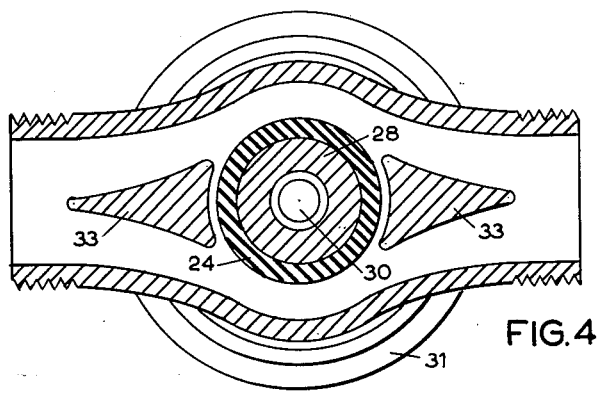

Preferred forms of this invention are illustrated in the accompanying diagrammatic drawings in which:

FIG. 1 is a sectional elevation of one form of valve according to this invention, FIG. 2 is a sectional elevation of an alternative form, and FIGS. 3 and 4 are sectional views of modifications of the valve shown in FIG. 1.

As shown in FIG. 1 the valve consists of a body 1 having a passage 2 for fluid flow therethrough and means such as the screw threads 3 at either end for connecting the valve in a pipe line. The central portion of the body 1 is of bulbous shape as is indicated by the lines 4 in the drawings and the shape of the outer wall 25 shown in FIG. 4. The closure member for the embodiment shown in FIG. 1 is in the form of a composite plug which comprises a cylindrical outer sleeve 5 and an internal deformable plug member 6. The sleeve 5 has external flanges 7 which fit in the recessed or socket portions 8 at the top and bottom of the valve body and around apertures 9 through the wall of the body 1. The flanges are clamped in position by the ring nuts 10 and 11 so that the interior of the cylindrical sleeve 5 is fully sealed from the bore of the valve body 1 forming the passage 2 for fluid through the valve.

The internal member 6 is located between a flange 12 on spindle 13 and a washer 14, the latter being in turn retained in position by a further ring nut 15 which is threaded into the internally threaded portions of nut 11. The top of the spindle 13 is screw threaded and engaged by the screw threaded hub 16 of handwheel 17. It will be seen with this structure that as the handwheel 17 is rotated to screw onto the spindle 13 the latter will be drawn upwardly thereby directly compressing the plug member 6 between the washer 14 and flange 12. The plug 6 thus bulges outwardly causing corresponding distortion of the sleeve 5 which thereby controls the fluid flow through the valve by closing off the annular path normally open for fluid flow around the composite plug in the bulbous portion of the valve body 1. The lock nut 18 prevents the handwheel 17 being screwed off the spindle 13 and the extension of the spindle through the bottom nut 10 assists in locating the spindle, the position of the extension also indicating whether the valve is open or closed. It will be noted that by loosening nut 15 the whole centre portion of the assembly can be removed and replaced without interfering with the seal between the sleeve 5 and the valve body 1.

The valve described has advantages in that it facilitates sealing of all the moving parts of the valve and it enables the directly stressed portion to be made of a material most suitable to withstand these stresses while the indirectly stressed portion may be of a softer material ensuring good sealing qualities and/or wear, corrosion or chemical resistance according to requirements.

The embodiment shown in FIG. 2 operates on a somewhat similar principle, the sleeve 5 in this case being preferably filled with liquid and being caused to bulge outwardly by downward movement of the resilient cover piece 19 clamped around its periphery as shown. It will be noted that the flanges 7 of sleeve 5 are firmly clamped in position to prevent leakage by the same unit as that holding the cover piece 19. The downward movement of the cover piece 19 is effected by screwing the spindle 20 into the socket 21 so that the core 22 between the spindle 20 and cover piece 19 is pressed into the interior of the sleeve 5. This movement takes place against the compression of the spring 23 which acts to return the parts to their original positions when the spindle 20 is unscrewed. It will be clear that the distortion of the sleeve 5 controls the fluid flow through the valve in a manner similar to that described above while the waisted shape of the sleeve 5, or in other words the reduced cross section of this sleeve at its medial portion as contrasted to the larger cross section at its opposite extremities, increases the dimensions of the path for fluid around the plug with the valve in the open position or alternatively enables the size of the bulbous position of the body to be reduced.

The embodiment shown in FIGS. 3 and 4 utilises a resilient sealing sleeve 24 which is held in sealing engagement with the valve body 25 by the threaded plugs 26 which clamp the sleeve flanges 27 in the top and bottom spigot portions of the valve body 1. Inside the sleeve 24 is an annular resilient core 28 with the ends thereof positioned between stops in the form of the nuts 29 shown and to which said ends may be bonded or otherwise secured. A spindle 30 is threaded through the nuts 29 and has a left and right hand threaded portion, one screwed through each nut so that on rotation of the spindle 30 the nuts 29, sliding in the plugs 26, will either be positively drawn together or positively moved apart. The drawing of the nuts together will bulge the core 28 and sleeve 24 outwardly to close or partially close the valve in a manner similar to that described in relation to FIG. 1.

Rotation of the spindle 30 to effect such movement is done by the handwheels 31 of which it will be noted that there is one attached to each end of the spindle 30 by nuts 32 so that the valve may be operated from either side. If desired, however, the one handwheel may be replaced by a plate.

To ensure that the core 28 and sleeve 30 are bulged to a maximum degree at right angles to the direction of fluid flow the guides 33 shown clearly in FIG. 4 are incorporated in the body. These guides 33 limit the movement of the core 28 and sleeve 24 in the axial direction of the valve body 25 thereby reducing to a minimum the amount of movement of the nuts 29 necessary to ensure full closure of the valve. The guides 33 may also be shaped so as to streamline the flow of fluid through valve resulting in a low flow resistance when the valve is in usefully open position.

It will be noted in this construction that the core 28, spindle 30 and associated parts may be removed while leaving the sleeve 24 in sealing engagement with the body in a similar manner to the embodiment shown in FIG. 1.

It will be appreciated that an annular pocket 34 (indicated by dotted lines in FIG. 1) may be provided in the outer sleeve to facilitate distortion of the sleeve during operation of the valve. The pocket 34 will preferably be filled with liquid.

What I claim as new and desire to secure by Letters Patent is:

1. A valve for the control of fluid flow comprising a valve body, a passageway through said body, oppositely disposed apertures through the walls of said passageway, a composite plug located in said passageway between the apertures, an annular fluid path around said plug in the passageway, said plug having an outer deformable sleeve positioned across the passageway, ends for the sleeve retained in sealing engagement around the apertures, a further deformable member positioned within said sleeve and an operating mechanism for said valve connected to said further member and adapted to deform said further member which is adapted in turn to deform said sleeve to close the annular fluid path around said composite plug.

2. A valve as defined in claim 1 wherein outwardly extending screw threaded sockets are provided around said apertures, flanges are provided on the sleeve ends and ring nuts are threaded into said sockets to retain said flanges in sealing engagement around said apertures.

3. A valve as defined in claim 1 wherein liquid is contained in said further deformable member, the outer deformable sleeve is made as a resilient cover piece for said sleeve and means are provided to retain the cover piece in position around its periphery.

4. A valve as defined in claim 1 wherein the medial portion of the outer sleeve is of reduced cross section relative to the extremities thereof in its unstressed shape.

5. A valve as defined in claim 1 wherein the valve body is of bulbous shape around the composite plug.

6. A valve for the control of fluid flow comprising a valve body, a passageway through said body, oppositely disposed apertures through the walls of said passageway, a composite plug located in said passageway between the apertures, an annular fluid path around said plug in the passageway, said plug having an outer deformable sleeve positioned across the passageway, ends for the sleeve retained in sealing engagement around the apertures, a further deformable member positioned within said sleeve, said further member consisting of a rotatable spindle extending across the valve body between the apertures, a pair of stops on said spindle and a second sleeve positioned on said spindle between said stops, said stops movable relative to each other in association with rotation of the spindle and an operating mechanism for said valve connected to said further member and adapted to deform said further member which is adapted in turn to deform said sleeve to close the annular fluid path around said composite plug.

7. A valve as defined in claim 4 wherein one of said stops is fixed to the spindle and the other to the valve body.

8. A valve as defined in claim 6 wherein screw threads of opposite hands are provided on the ends of the spindle and the stops are nuts screwed onto the spindle ends.

9. A valve for the control of fluid flow comprising a valve body, a passageway through said body, oppositely disposed apertures through the walls of said passageway, a composite plug located in said passageway between the apertures, an annular fluid path around said plug in the passageway, said plug having an outer deformable sleeve positioned across the passageway, ends for the sleeve retained in sealing engagement around the apertures, a further deformable member positioned within said sleeve, said further member consisting of rotatable spindle extending across the valve body between the apertures, a pair of stops around said spindle and a second sleeve positioned on said spindle between said stops, said stops movable relative to each other in association with rotation of the spindle and an operating mechanism for said valve connected to said further member and adapted to deform said further member which is adapted in turn to deform said sleeve to close the annular fluid path around said composite plug, said operating mechanism being in the form of a pair of handwheel assemblies one associated with each end of the spindle.

10. A valve for the control of fluid flow comprising a valve body, a passageway through said body, oppositely disposed apertures through the walls of said passageway, a composite plug located in said passageway between the apertures, an annular fluid path around said plug in the passageway, said plug having an outer deformable sleeve positioned across the passageway, ends for the sleeve retained in sealing engagement around the apertures, a body of liquid within said sleeve, a further deformable member positioned within said sleeve, said further member being in the form of a resilient cover piece for said sleeve, means provided to retain the cover piece in position around its periphery, an operating mechanism for said valve consisting of a socket projecting from the valve body, screw threads in said socket, a movable core in said socket on said cover piece, a spindle with a handwheel thereon and threaded into said socket in engagement with said core, whereby to urge said core against said further member and thereby to deform said sleeve to close the annular fluid path around said composite plug.

11. A valve for the control of fluid flow comprising a valve body, a passageway through said body, oppositely disposed apertures through the walls of said passageway, a composite plug located in said passageway between the apertures, an annular fluid path around said plug in the passageway, said plug having an outer deformable sleeve positioned across the passageway, ends for the sleeve retained in sealing engagement around the apertures, a further deformable member positioned within said sleeve at least one pocket formed in said sleeve and an operating mechanism for said valve connected to said further member and adapted to deform said further member which is adapted in turn to deform said sleeve to close the annular fluid path around said composite plug.

12. A valve as defined in claim 11 wherein said pocket is filled with liquid.

References Cited in the file of this patent

FOREIGN PATENTS 416,588    Italy _____ 1946